(12) United States Patent
Murata et al.

(10) Patent No.: US 6,266,106 B1
(45) Date of Patent: Jul. 24, 2001

(54) LIQUID CRYSTAL SHUTTER GLASSES HAVING INCLINED LIQUID CRYSTAL GLASSES

(75) Inventors: Haruhiko Murata, Takatsuki; Yukio Mori, Kadoma; Kenji Oyamada, Hirakata; Takashi Miwa, Higashiosaka, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/158,608

(22) Filed: Sep. 23, 1998

(30) Foreign Application Priority Data

Sep. 24, 1997 (JP) .................................................. 9-258108
Sep. 24, 1997 (JP) .................................................. 9-258109

(51) Int. Cl.[7] .......................... G02F 1/1335; G02B 27/22; G09G 3/00
(52) U.S. Cl. ............................ 349/15; 349/13; 359/466; 345/32
(58) Field of Search ........................ 349/13, 15; 359/466; 345/32

(56) References Cited

U.S. PATENT DOCUMENTS

| | | | |
|---|---|---|---|
| 4,698,668 | * | 10/1987 | Milgram ................................. 358/92 |
| 4,982,278 | * | 1/1991 | Dahl et al. ............................. 358/88 |
| 5,281,957 | * | 1/1994 | Schoolman ........................... 340/705 |
| 5,463,428 | * | 10/1995 | Lipton et al. ......................... 351/158 |
| 5,506,705 | * | 4/1996 | Yamamoto et al. .................... 359/40 |

* cited by examiner

Primary Examiner—Kenneth Parker
Assistant Examiner—Mike Qi
(74) Attorney, Agent, or Firm—Arent Fox KinterPlotkin & Kahn, PLLC

(57) ABSTRACT

Liquid crystal for a right eye and liquid crystal for a left eye are not positioned in one plane, but are positioned to incline at an angle of 5°. To be concrete, both liquid crystal are inclined so that they become closer to the viewer's face as making toward the side of the face from the middle of the forehead. The inclination of liquid crystal as above-described to set the preferential direction of visual view of liquid crystal to be horizontal leads in that the direction by which the high contrast of liquid crystal can be obtained is toward the 3D display. It diminishes a phenomenon like cross-talk and allows the viewer to view the appropriate stereoscopic image. Liquid crystal for a right eye and liquid crystal for a left eye have the same construction. These liquid crystals make contrast with each other and then they are mounted on the liquid crystal shutter glasses portion. This makes it possible for each electrode to position in the center of liquid crystal shutter glasses portion. The construction in which the electric circuit is in the center of the liquid crystal shutter glasses portion makes it easy to make electric contact between the circuit and the electrode.

15 Claims, 7 Drawing Sheets

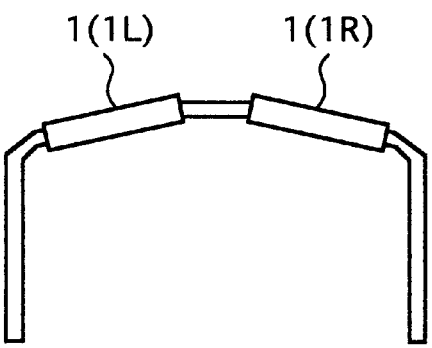
Fig.1A
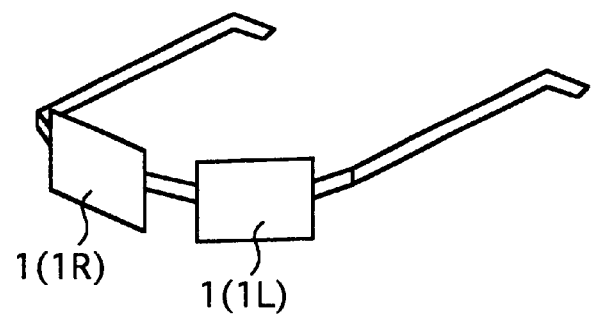
Fig.1B
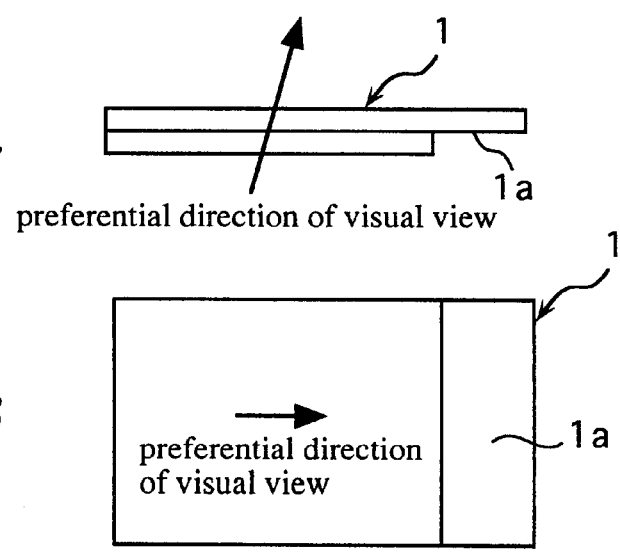
Fig.2A
Fig.2B

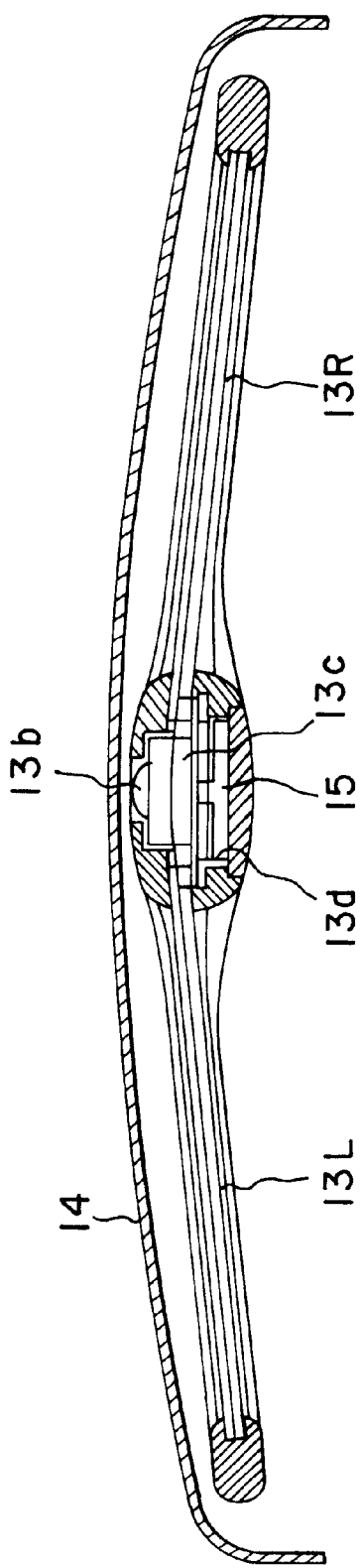

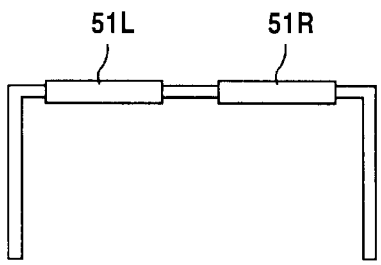
Fig.10A
PRIOR ART
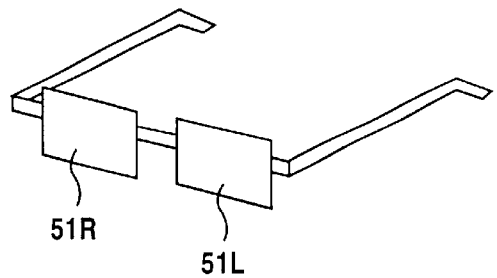
Fig.10B
PRIOR ART
Fig.11A
PRIOR ART
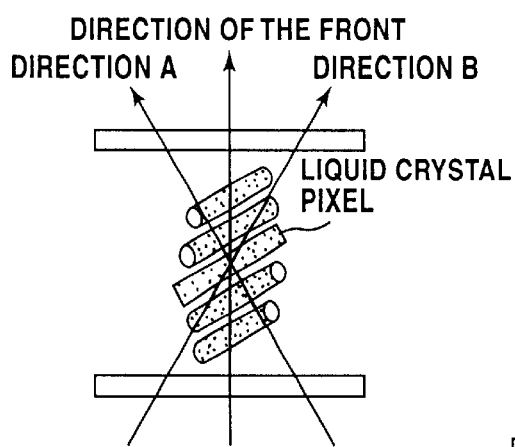
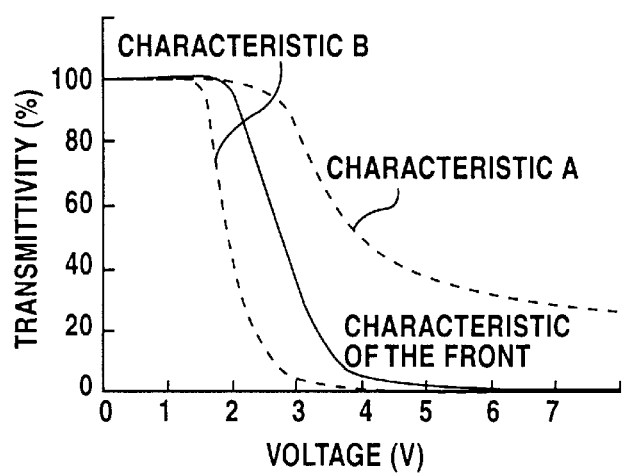
Fig.11B
PRIOR ART

LIQUID CRYSTAL SHUTTER GLASSES HAVING INCLINED LIQUID CRYSTAL GLASSES

BACKGROUND OF THE INVENTION

1. Field of the Invention

The present invention relates to liquid crystal shutter glasses.

2. Description of Prior Art

A three-dimensional image display system by which a viewer with liquid crystal shutter glasses can view stereoscopic image is well-known. The three-dimensional image display system alternately displays images for a right eye and images for a left eye on a screen in a determined period. (The term "3D display" in this specification indicates the above type of display.) As regarding liquid crystal shutter glasses on which a viewer puts, liquid crystal for a right eye and liquid crystal for a left eye alternately transmit light and do not transmit light respectively in synchronization with the determined period.

FIG. 10A is a plan view showing the conventional liquid crystal shutter glasses. FIG. 10B is a perspective view showing the conventional liquid crystal shutter glasses, as seen from the front side. These figures show that liquid crystal for a right eye and a left eye of the conventional liquid crystal shutter glasses are positioned in one plane. In other words, when the viewer puts on the liquid crystal shutter glasses, both liquid crystal for a right eye 51R and liquid crystal for a left eye 51L become parallel to a screen of 3D display (not shown).

As regard to display which use liquid crystal particularly, the dependence on the visual angle has become a problem. That is, color and brightness of a screen change depending on an angle at which the viewer watches the screen and the direction in which the viewer watches the screen. This dependence on the visual angle is explained in FIGS. 11A and 11B. FIG. 11A is a sectional model view of liquid crystal pixel, and FIG. 11B is a graph showing the change of transmittivity (T) to the change of the voltage (V) when the transmittivity at a voltage of 0V is 100%. Characteristic A, characteristic of the front, and characteristic B in FIG. 11B respectively correspond to direction A, direction of the front, direction B in FIG. 11A. Liquid crystal has the dependence on the visual angle, so that, generally speaking, a screen may look white or black when viewed from the upper or lower direction.

Liquid crystal shutter glasses of FIGS. 10A and 10B composed of liquid crystal which have the dependence on the visual angle make it impossible to obtain the highest contrast to the screen direction of the 3D display. Insufficient contrast causes the following inconveniences. When liquid crystal for a right eye 51R transmits light and liquid crystal for a left eye 51L does not transmit light, the image for a right eye transmits the liquid crystal for a left eye 51L that should not transmit light and the images streams through the left eye of the viewer. When liquid crystal for a left eye 51L transmits light and liquid crystal for a right eye 51R does not transmit light, the image for a left eye transmits the liquid crystal for a right eye 51R that should not transmit light and the images streams through the right eye of the viewer. Occurrence of crosstalk obstructs adequate stereoscopic view.

As shown in FIGS. 10A and 10B, the common eyeglasses type of liquid crystal shutter glasses that the viewer's nose and ears hold liquid crystal shutter glasses portion and the goggle type of liquid crystal shutter glasses that rubber band or the like press down liquid crystal shutter glasses portion to the viewer's face are well-known as the conventional type of liquid crystal shutter glasses. Such liquid crystal shutter glasses as common eyeglasses type and goggle type, however, are awkward to use for those who put on eyeglasses.

SUMMARY OF THE INVENTION

The present invention has been made in consideration of the above circumstances and has an object to provide liquid crystal shutter glasses by which the high contrast to a screen direction of 3D display, that is, to the front direction, can be obtained when a viewer with liquid crystal shutter glasses views the screen of 3D display which is positioned in front of the viewer. Another object of the present invention is to provide the liquid crystal shutter glasses which is easy to handle for those who put on eyeglasses.

Liquid crystal shutter glasses of the present invention, wherein liquid crystal for a right eye and liquid crystal for a left eye alternately transmit light and do not transmit light respectively in a determined period to enable the viewer to view stereoscopic image, is characterized by that liquid crystal for a right eye and liquid crystal for a left eye are inclined so that the directions to obtain the high contrast of said liquid crystal for right and left eyes face on the approximate front of the screen.

In the above construction, the high contrast to the direction of the screen that displays stereoscopic image can be obtained and the disappearance of cross-talk realizes adequate stereoscopic view.

Liquid crystal shutter glasses of the present invention, wherein liquid crystal for a right eye and liquid crystal for a left eye alternately transmit light and do not transmit light respectively in said determined period to enable the viewer to view stereoscopic image, is also characterized by that preferential directions of visual view of liquid crystal for right and left eyes are set horizontally (in horizontal plane) and liquid crystal for a right eye and a left eye are inclined in correspondent to the preferential direction of visual view so that the directions to obtain the high contrast of said liquid crystal for right and left eyes face on the approximate front of the screen.

Liquid crystal shutter glasses of the present invention, wherein liquid crystal for a right eye and liquid crystal for a left eye alternately transmit light and do not transmit light respectively in said determined period to enable the viewer to view stereoscopic image, is also characterized by that the preferential directions of visual view of liquid crystal for right and left eyes are set vertically (in vertical plane) and liquid crystal for a right eye and a left eye are inclined in correspondent to the preferential direction of visual view so that the directions to obtain the high contrast of said liquid crystal for right and left eyes face on the approximate front of the screen.

Liquid crystal shutter glasses of this invention comprises a band portion which is put over from around the viewer's forehead to the upper-side of his ears, a connecting portion overhanging from around said forehead of said band portion, liquid crystal shutter glasses portion mounted on said connecting portion so as to face to the front of the viewer's eyes, and slip restraint means to restrain said band portion from slipping down the viewer's head.

In the above construction, liquid crystal shutter glasses portion is provided so as to overhang from around said forehead of the band portion and face to the front of the viewer's eyes. Therefore, users with eyeglasses can put on the liquid crystal shutter glasses without any inconvenience. Further, the slip restraint means to restrain said band from slipping down the viewer's head can have a sufficient capability to retain the liquid crystal shutter glasses.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1A is a plan view of liquid crystal shutter glasses according to a first embodiment of the present invention, and FIG. 1B is a perspective view of the same.

FIG. 2A is a plan view of liquid crystal used in the liquid crystal shutter glasses of FIG. 1, and FIG. 2B is a front view of the same.

FIG. 7 is a cross-sectional view of FIG. 5 taken along the line A—A.

FIG. 10A is a plan view of a conventional liquid crystal shutter glasses, and FIG. 10B is a perspective view of the same.

FIG. 11A is a sectional model view of pixel of liquid crystal display panel, and FIG. 11B is a characteristic chart showing the relation between the transmittivity (T) and the voltage (V) of said pixel.

Figure 3:
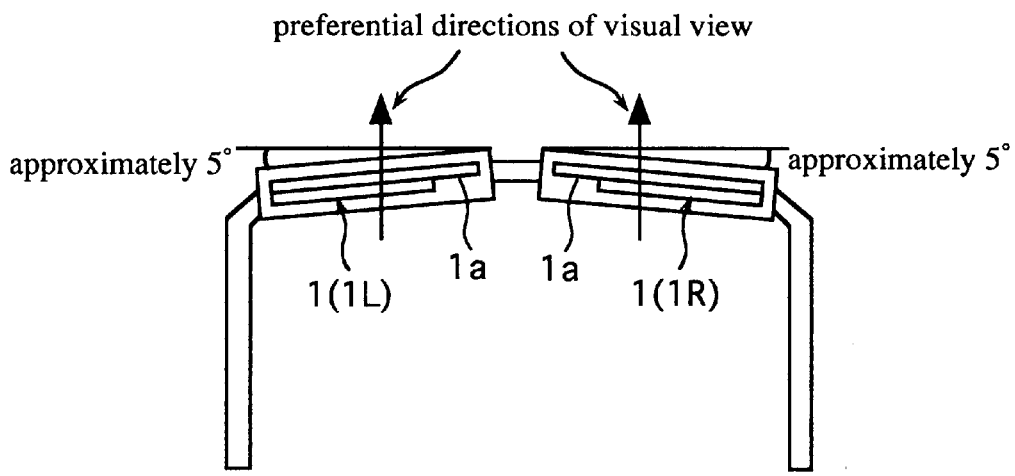
FIG. 3 is a plan view of liquid crystal shutter glasses in which liquid crystals of FIG. 2 are set, in perspective representation.
Figure 4:
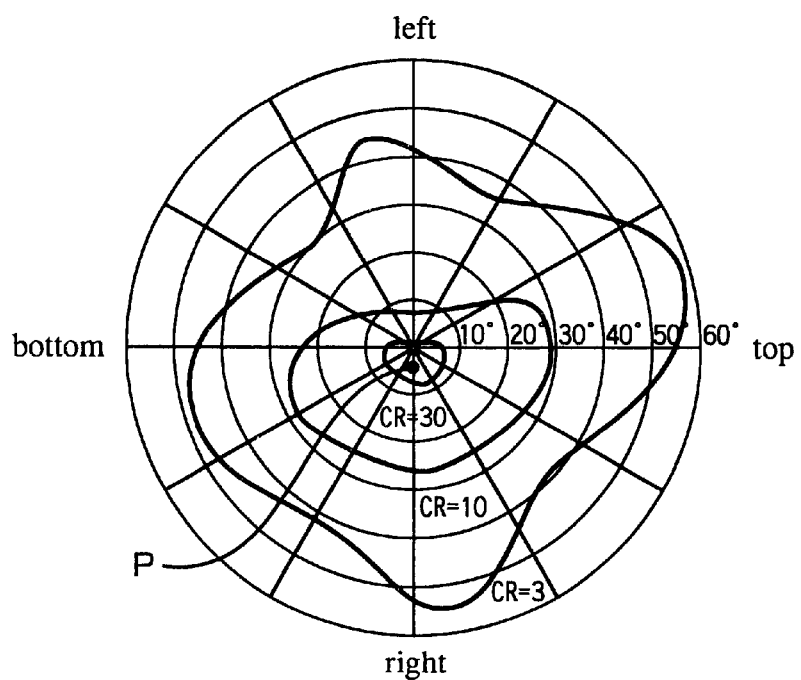
FIG. 4 is a characteristic chart of the dependence on the visual angle of liquid crystal display contrast.

DESCRIPTION OF THE PREFERRED EMBODIMENTS (Embodiment 1)

This embodiment discloses liquid crystal shutter glasses that can obtain high contrast. The following are the explanation of liquid crystal shutter glasses in this embodiment according to FIGS. 1A, 1B, 2A, 2B, 3, and 4. An electrode 1a on which voltage for driving liquid crystal is supplied is formed on liquid crystal 1 of liquid crystal shutter glasses as shown in FIGS. 2A and 2B. This embodiment uses STN mode for liquid crystal 1. An arrow in FIG. 2B shows a preferential direction of the visual view. The preferential direction of visual view is a direction in which the dependence on the visual angle in liquid crystal contrast is large. The preferential direction of visual view is determined by the direction of rubbing process in manufacturing liquid crystal 1, and so on.

Liquid crystal for a right eye 1(1R) and liquid crystal for a left eye 1(1L) are not positioned in one plane, but are positioned to incline at an angle of about 5°. Specifically, said liquid crystal 1R and 1L are inclined so that the distance between liquid crystal and the viewer's face becomes closer as making toward the side of the face from the center of the face. In other words, when the viewer puts on the liquid crystal shutter glasses, the right side of liquid crystal for a right eye and the left side of liquid crystal for a left eye are respectively farther form 3D display screen (not shown) which is positioned in the front of the viewer, as compared with the distance between the center of the glasses and 3D display screen.

Setting the preferential direction of visual view as shown in FIG. 2B and inclining the liquid crystal 1R and 1L as above-mentioned result into that the direction B becomes equivalent to the direction of the front as explained according to FIGS. 11A and 11B. That is, the direction by which high contrast can be obtained faces to the front of the 3D display screen. Further explanation is made according to the characteristic chart on the dependence on visual angle of display contrast in FIG. 4. When liquid crystal is parallel to the 3D display screen, the direction of the front for liquid crystal faces to the direction of the screen, and the direction of the screen is equivalent to the center of the chart. By inclining liquid crystal, the front direction for liquid crystal slides from the direction of the screen and it becomes equivalent to the point P in FIG. 4. By obtaining the high contrast in this manner, such phenomenon as cross-talk almost disappears and the adequate stereoscopic view becomes possible.

Taking the design of liquid crystal shutter glasses into consideration, the direction of inclination intends that the distance between liquid crystal and the viewer's face becomes closer as making toward the side of the face from the center of the face. Although liquid crystal 1 can be used for both left and right eyes as they are positioned in FIG. 2B, liquid crystal for a right eye 1R becomes farther as making toward the side of the face from the center of the face, resulting into poor-looking design of glasses. Therefore, by turning round liquid crystal for a right eye 1R by an angle of 180 degrees from the positional state in FIG. 2B, the structure in FIG. 3 can be realized. In such manner, good-looking design of glasses can be achieved while using liquid crystals of the same structure.

In the construction as shown in FIG. 3, electrodes 1a of each liquid crystal are disposed in the middle of liquid crystal shutter glasses (between liquid crystal for a right eye 1R and liquid crystal for a left eye 1L). Therefore, making the electric contact between the circuit and each of liquid crystal 1R and 1L becomes easy and effective assembly work can be achieved when the electric circuit (a circuit to make the liquid crystal 1R and 1L shut and open alternately on receiving the infrared-ray signal from 3D display) is disposed in the center of the liquid crystal shutter glasses. In such case as the structure in which said electrode 1a is separate from the electric circuit, it is necessary to connect the electrode 1a and the electric circuit. Consequently, the possibility of breaking the wire and of becoming poor-looking may occur, while no trouble will happen in the structure of FIG. 3.

(Embodiment 2)

This embodiment discloses liquid crystal shutter glasses which can obtain high contrast and are easy to handle for users with eyeglasses. The following are the explanation of this embodiment according to FIGS. 5, 6, 7.

Liquid crystal shutter glasses consist of a band portion 11 which is put over from around the viewer's forehead to the upper-side of his ears, the connecting portion 12 overhanging from around the forehead of said band portion 11, liquid crystal shutter glasses portion 13 mounted on said connecting portion 12 so as to face the front of the viewer's eyes, and the transparent plate for protecting glasses 14.

The band portion 11 is made from elastic materials such as resin. The connecting portion 12 is composed as not to rotate by the weight of glasses portion 13 but as to rotate by manual handling, and retain the position after moving round. Liquid crystal for a right eye 13R and liquid crystal for a left eye 13L are put in the frame 13a of the liquid crystal shutter glasses portion 13. In this embodiment, STN mode is used for liquid crystal 13R and 13L.

The infrared-rays receiving portion 13b is provided on the middle-upper front surface of said frame 13a. Said infrared-rays receiving portion 13b receives infrared-rays signals transmitted from 3D display (not shown) and feeds signals corresponding to the infrared-rays signals to LSI for signal processing 113c within the frame 13a. The LSI for signal processing 113c determines a field period (a timing to alternate images for a right eye and images for a left eye) on the basis of said signals, and makes liquid crystal for a right eye 13R and liquid crystal for a left eye 13L shut and open alternately on the basis of this period. A cell chamber 13d is provided on the upper-middle rear surface of said frame 13a. The coin cell put in the cell chamber supplies power to LSI for signal processing 113c, liquid crystal for a right eye 13R, liquid crystal for a left eye 13L and so on.

Also in this embodiment, liquid crystal for a right eye 13R and liquid crystal for a left eye 13L are positioned not to be in one plane, but to incline at an angle of about 5° so as to become closer to the viewer's face as making toward from the center of his face to the side of his face. Further, by the preferential directions of visual view being situated horizontally (in horizontal plane) and facing to the same direction, good design of liquid crystal shutter glasses can be realized while having liquid crystal of the same construction.

Liquid crystal shutter glasses of this embodiment have a structure that liquid crystal shutter glasses portion 13 is provided to the band 11 which is put over from around the viewer's forehead to the upper-part of his ears by connecting with the connecting portion 12. Therefore, the user, even if putting on eyeglasses, can wear liquid crystal shutter glasses without any trouble.

The preferential direction of visual view can be vertical. In this case, inclination is made so that the distance between the face and the liquid crystal becomes farther as making upward or as making downward. Although these kind of liquid crystal shutter glasses are also possible, design of liquid crystal shutter glasses becomes better when the preferential direction of visual view is horizontal.

The contrast of liquid crystal relates to whether the supplied voltage to liquid crystal is high or low. Therefore, liquid crystal shutter glasses of low power consumption can be realized by reducing the voltage supplied to liquid crystal, while making the degree of contrast the same as the conventional construction at the same time.

(Embodiment 3)

Figure 8A:
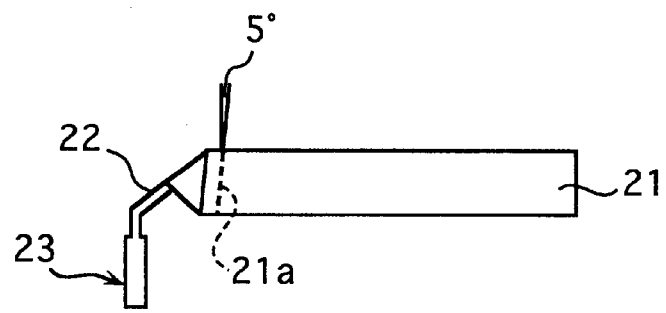
FIG. 8A is a side view of liquid crystal shutter glasses according to a third embodiment of the present invention and FIG. 8B is a perspective view of the same.
Figure 8B:
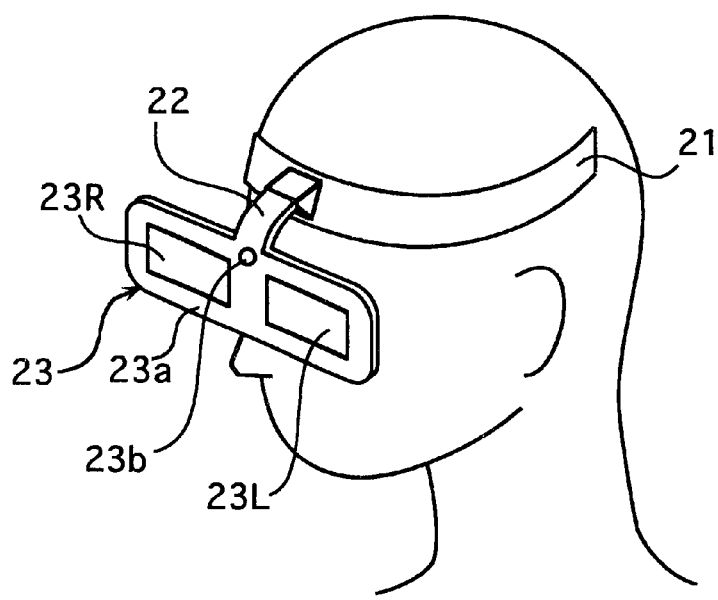
Figure 9A:
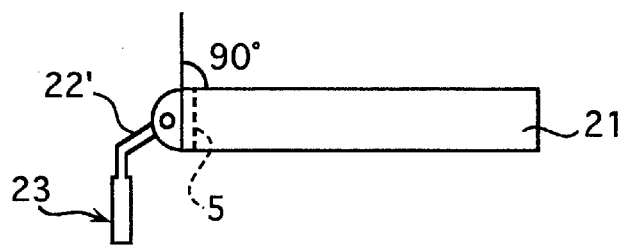
FIG. 9A is a side view of liquid crystal shutter glasses according to a fourth embodiment of the present invention.
Figure 9B:
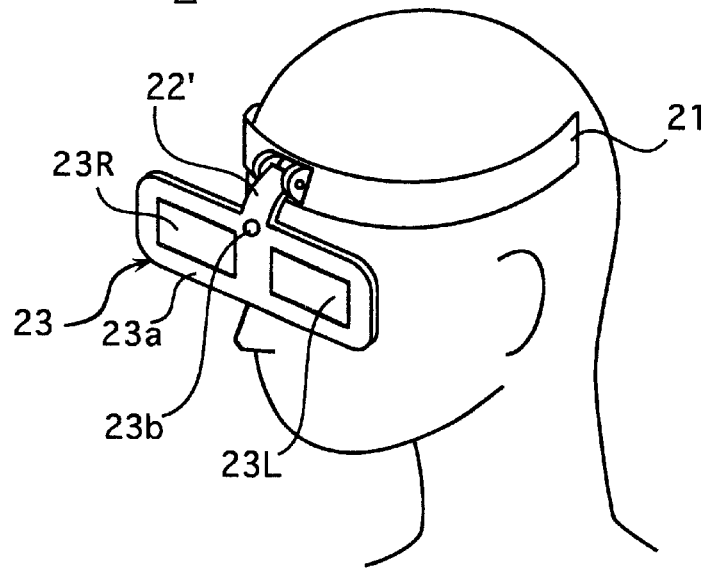
FIG. 9B is a perspective front view of said liquid crystal shutter glasses.
Figure 9C:
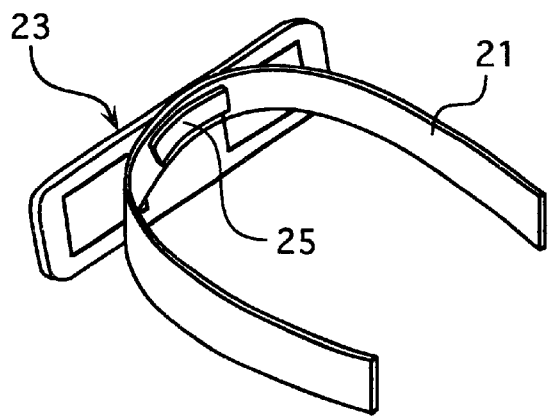
FIG. 9C is a perspective view of said liquid crystal shutter glasses viewed from behind.
Figure 9D:
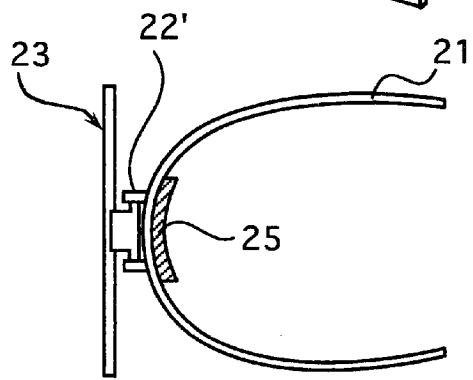
FIG. 9D is a plan view of said liquid crystal shutter glasses.

This embodiment discloses liquid crystal shutter glasses that are hard to slip down the viewer's head and easy to use for those wearing eyeglasses. The following are the explanation on liquid crystal shutter glasses on this embodiment according to FIGS. 8A and 8B.

Liquid crystal shutter glasses consist of a band portion 21 which is put over from around the viewer's forehead to the upper-side of his ears, the connecting portion 22 overhanging from around said forehead of the band portion 21, and liquid crystal shutter glasses portion 23 mounted on said connecting portion 22 so as to face the front of the viewer's eyes.

Said band portion 21 is made from elastic materials such as resin. And inclining portion 21a which inclines toward the viewer's forehead corresponding to the angle of his forehead is formed around the forehead part of the band portion 21. The inclining portion 21a functions as slip restraint portion to restrain band portion 21 from slipping down the viewer's head. In this embodiment, the angle of inclining portion 21a is about 5°. It is, however, not necessarily required. Note that, the excessively large inclining angle results into badly fitting to the forehead, and the excessively small inclining angle results into lowering slide restraint capacity. Therefore, it is desired to determine the inclining angle by taking these balances into consideration.

The connecting portion 22 is constructed so as to transform not by the weight of liquid crystal shutter glasses 23 but by manual handling and to maintain the position after transformation. Thin lead film (or lead rod) coated with rubber, and plate type (or rod type) materials of flexible structure which consist of many movable small parts coupled can be specific examples of a structure.

Liquid crystal shutter glasses portion 23 consist of liquid crystal for a right eye 23R and liquid crystal for a left eye 23L that are put in said frame 23a. The infrared-rays receiving portion 23b is provided on the middle-upper front surface of said frame 23a. The infrared-rays receiving portion 23b receives infrared-rays signals transmitted from 3D display (not shown) and feeds signals corresponding to said infrared-rays signals to the LSI for signal processing within the frame 23a. The LSI for signal processing determines a field period (a timing to alternate images for a right eye and images for a left eye) on the basis of said signals, and makes liquid crystal for a right eye 23R and liquid crystal for the left eye 23L shut and open alternately on the basis of this period. A cell chamber (not shown) is provided on the upper-middle rear surface of said frame 23a. The coin cell put in the cell chamber supplies power to said LSI for signal processing, liquid crystal for a right eye 23R, and liquid crystal for a left eye 23L and so on.

In accordance with the above-mentioned construction, liquid crystal shutter glasses portion 23 is positioned to face to the front of the eyes, overhanging from around the forehead of the band portion 21. Therefore, users, even if wearing eyeglasses, can put on the liquid crystal shutter glasses without any problems. Furthermore, the inclining portion 21a as slip restraint means restrains said band 21 from slipping down the viewer's forehead, resulting in obtaining the sufficient capability to retain the liquid crystal shutter glasses.

The transformable connecting portion 22 allows appropriate arrangement in any situation by such accommodating operation as that the viewer without eyeglasses moves liquid crystal shutter glasses close to his eyes or that the viewer with eyeglasses moves liquid crystal shutter glasses far from his eyes so that the liquid crystal shutter glasses is not interfered with the eyeglasses. In this construction of which the connecting portion 22 can transform rather than rotate, said accommodating operation is possible while maintaining the liquid crystal shutter glasses portion 23 and the viewer's eyes to be approximately parallel, which is required by the characteristic of liquid crystal.

(Embodiment 4)

This embodiment discloses liquid crystal shutter glasses that are hard to slip down and easy to use for those wearing eyeglasses. The following are the explanation on liquid crystal shutter glasses in this embodiment according to FIGS. 9A, 9B, 9C, and 9D.

The high friction material 25 as slip restraint means is provided around the part where the inner side of band 21 is contact with the forehead. Materials for the high friction material 25 are desired to be urethane or the like which is soft and gentle when it contacts with human skin. It goes without saying that high friction material 25 may be used in not only the part which contacts with the forehead but other parts.

Liquid crystal shutter glasses of this embodiment has the connecting portion 22' which is constructed to rotate on a horizontal axis. This connecting portion 22' constructed to rotate allows for liquid crystal shutter glasses portion 23 to accommodate to the eyes. This accommodation might make it impossible for liquid crystal shutter glasses portion 23 and viewer's eye to keep approximately parallel. However, the adoption of the structure in which the connecting portion, not only with the band portion 21 but also with the liquid crystal shutter glasses portion 23, can rotate, can make it possible to maintain the approximate parallel between liquid crystal shutter glasses portion 23 and the viewer's eyes by said accommodating operation.

The above-mentioned liquid crystal shutter glasses enable the viewer with eyeglasses to put on the liquid crystal shutter glasses without any constraints. Furthermore, the large friction material 25 as slip restrain means can realize the high capacity of retaining the liquid crystal shutter glasses. The adoption of the structure in which the connecting portion moves round is effective for both users with eyeglasses and users without eyeglasses.

Figure 5:
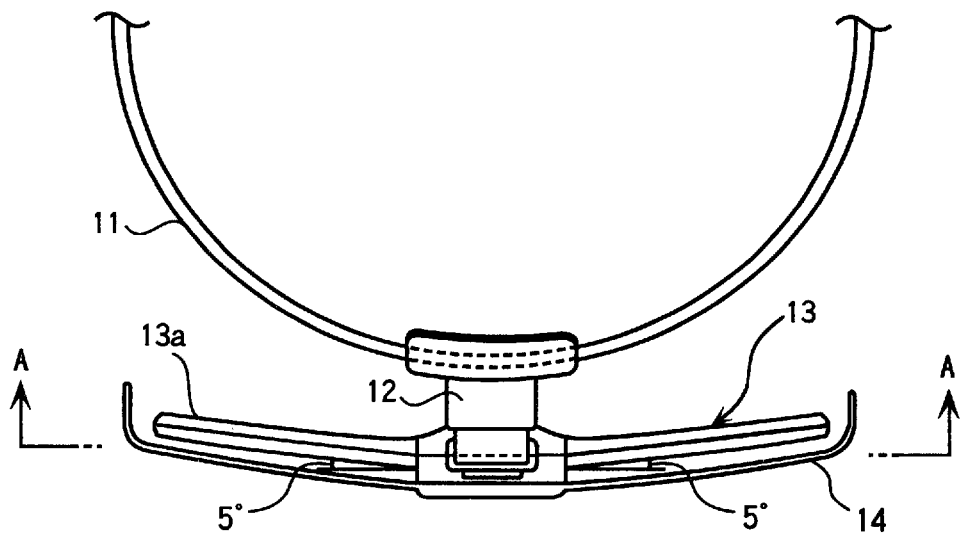
FIG. 5 is a plan view of liquid crystal shutter glasses according to a second embodiment of the present invention.
Figure 6:
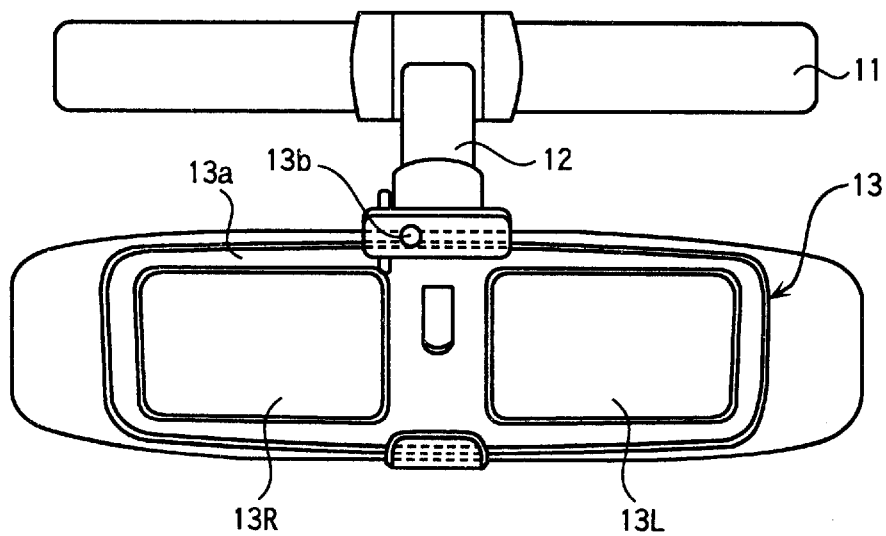
FIG. 6 is a front view of liquid crystal shutter glasses according to a forth embodiment of the present invention.

It goes without saying that both incline portion 21a and the high friction material 25 can be used as the slip restraint means. In this case, the capability to restrain slipping will further improve. Instead of forming inclining portion in band portion 21, inclining portion can be formed in high friction material 25 by processing large friction material into the inclining shape. The slip restraint portion can be applied to the structure in the embodiment 2 (FIGS. 5, 6, and 7).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. The liquid crystal shutter glasses whose liquid crystal for a right eye and liquid crystal for a left eye alternately transmit light and do not transmit light respectively in a predetermined period to enable a viewer to view stereoscopic image, wherein:

said liquid crystal for a right eye and liquid crystal for a left eye are inclined so that said liquid crystal for right and left eyes face on the approximate front of the screen to obtain a high contrast.

2. The liquid crystal shutter glasses whose liquid crystal for a right eye and liquid crystal for a left eye alternately transmit light and do not transmit light respectively in a determined period to enable the viewer to view stereoscopic image, wherein:

the preferential direction of visual view for said liquid crystal for a right eye and a left eye are set in the horizontal direction;

the liquid crystal for a right eye and the liquid crystal for a left eye are inclined in correspondent to the preferential direction of visual view so that the directions to obtain the high contrast of said liquid crystal for right and left eyes face on the approximate front of the screen.

3. The liquid crystal shutter glasses whose liquid crystal for a right eye and liquid crystal for a left eye alternately transmit light and do not transmit light respectively in a determined period to enable the viewer to view stereoscopic image, wherein:

the preferential direction of visual view for said liquid crystal for right and left eyes are set in the vertical direction;

the liquid crystal for a right eye and the liquid crystal for a left eye are inclined in correspondent to the preferential direction of visual view so that the directions to obtain the high contrast of said liquid crystal for right and left eyes face on the approximate front of the screen.

4. The liquid crystal shutter glasses according to claim 2, wherein;

both liquid crystals for right and left eye are positioned so that the preferential directions of visual view are the same, electrodes for power supply are provided on the edge of each liquid crystal, said electrodes are positioned to be in the center of the glasses.

5. The liquid crystal shutter glasses according to claim 3, wherein;

both liquid crystal for right and left eyes are positioned so that the preferential directions of visual view are the same, electrodes for power supply are provided on the edge of each liquid crystal, said electrode are positioned to be in the center of the glasses.

6. The liquid crystal shutter glasses according to claim 1, comprising:

liquid crystal shutter glasses portion on which liquid crystal for a right eye and liquid crystal for a left eye are mounted;

band portion which is put over from around the forehead of the viewer to the upper side of the ears;

connecting portion which connects said band portion and said liquid crystal shutter glasses portion.

7. The liquid crystal shutter glasses according to claim 6, wherein:

slip restraint means to restrain said band portion from slipping down the head is also provided.

8. The liquid crystal shutter glasses according to claim 6, wherein:

said slip restraint means consists of inclining portion which is formed around the forehead of band portion and inclines toward the forehead.

9. The liquid crystal shutter glasses according to claim 6, wherein:

said connecting portion is transformed not by the weight of said liquid crystal glass portion but by manual handling, and has the structure to maintain the position after transformation.

10. The liquid crystal shutter glasses according to claim 6, wherein:

said connecting portion is moved round not by the weight of said liquid crystal glass portion but by manual handling, and has the structure to maintain the position after moving round said connecting portion.

11. The liquid crystal shutter glasses, comprising:

band potion which is put over the viewer's forehead to the upper side of the ears;

connecting portion which is provided to overhang from the position around said forehead of the band portion;

liquid crystal glass portion which is mounted on said connecting portion so as to face the front of the eyes wherein said liquid crystal glass portion is inclined so that said liquid crystal glass portion faces is on the approximate front of a screen to obtain a high contrast;

slip resistant means to restrain the band form slipping down the viewer's head.

12. The liquid crystal shutter glasses according to claim 11, wherein:

said slip restraint means consist of large friction materials provided inside of said band portion.

13. The liquid crystal shutter glasses according to claim 11, wherein:

said slip restraint means is constructed by inclining portion which is formed around the forehead of band portion and inclines toward the forehead.

14. The liquid crystal shutter glasses according to claim 11, wherein:

said connecting portion is transformed not by the weight of said liquid crystal glass portion but by manual handling, and have the structure to maintain the position after transformation.

15. The liquid crystal shutter glasses according to claim 11, wherein:

said connecting portion is rotated not by the weight of said liquid crystal glass portion but by manual handling, and have the structure to maintain the position after moving round said connecting portion.

* * * * *